United States Patent [19]

Schneider et al.

[11] Patent Number: 5,312,119
[45] Date of Patent: May 17, 1994

[54] VEHICLE LEVELING SYSTEM WITH SAFETY INTERLOCK

[75] Inventors: Robert H. Schneider; Jon D. Jacobs, both of Beaver Dam, Wis.

[73] Assignee: Versa Technologies, Inc., Racine, Wis.

[21] Appl. No.: 979,172

[22] Filed: Nov. 20, 1992

Related U.S. Application Data

[63] Continuation of Ser. No. 782,977, Oct. 24, 1991, Pat. No. 5,176,391.

[51] Int. Cl.⁵ .................................................. B60S 9/12
[52] U.S. Cl. ...................................... 280/6.1; 280/6.12; 280/755; 280/765.1; 280/840
[58] Field of Search .................... 280/840, 6.1, 6.12, 280/703, 755, 764.1, 765.1

[56] References Cited

U.S. PATENT DOCUMENTS

| | | |
|---|---|---|
| 3,404,899 | 10/1968 | Vogel . |
| 3,669,409 | 6/1972 | Eranosian . |
| 3,817,493 | 6/1974 | Hanser . |
| 3,885,813 | 5/1975 | Kern . |
| 3,901,532 | 8/1975 | Hornagold . |
| 4,044,999 | 8/1977 | Dodgen . |
| 4,053,073 | 10/1977 | Franchin . |
| 4,061,309 | 12/1977 | Hanser . |
| 4,067,543 | 1/1978 | Orth . |
| 4,071,147 | 1/1978 | Hornagold . |
| 4,082,249 | 4/1978 | Valdespino et al. . |
| 4,084,830 | 4/1978 | Daniel . |
| 4,165,861 | 8/1979 | Hanser . |
| 4,174,094 | 11/1979 | Valdespino et al. . |
| 4,216,939 | 2/1980 | Valdespino . |
| 4,558,886 | 12/1985 | Straub ............................ 280/840 |
| 4,597,584 | 7/1986 | Hanser . |
| 4,641,843 | 2/1987 | Morrisroe . |
| 4,678,041 | 7/1987 | Staudinger ....................... 280/6.12 |
| 4,743,037 | 5/1988 | Hanser . |
| 4,746,133 | 5/1988 | Hanser . |
| 4,784,400 | 11/1988 | Hofius . |
| 4,815,711 | 3/1989 | Bruno et al. . |
| 4,865,295 | 12/1989 | Halloway . |
| 4,887,840 | 12/1989 | Harara et al. . |
| 4,974,861 | 12/1990 | Itoh et al. . |
| 5,013,011 | 5/1991 | Halloway . |
| 5,176,391 | 1/1993 | Schneider et al. ............... 280/6.12 |

FOREIGN PATENT DOCUMENTS 222381  8/1958  Australia .

Primary Examiner—Eric Culbreth
Attorney, Agent, or Firm—Andrus, Sceales, Starke & Sawall

[57] ABSTRACT

A system for leveling a vehicle, such as a recreational vehicle, includes three extendable and retractable fluid-operated jacks. The leveling system further includes an arrangement for sensing when the vehicle's parking brake is released, or when the vehicle's transmission is moved out of neutral while the vehicle's engine is operating, to automatically retract the jacks in response to either condition.

5 Claims, 6 Drawing Sheets

VEHICLE LEVELING SYSTEM WITH SAFETY INTERLOCK

CROSS REFERENCE TO RELATED APPLICATION

This application is a continuation of application Ser. No. 07/782,977, filed Oct. 24, 1991, now U.S. Pat. No. 5,176,391, issued Jan. 5, 1993.

BACKGROUND AND SUMMARY

This invention relates to a leveling system for use with a vehicle, such as a recreational vehicle.

Various systems for leveling a recreational vehicle are known, such as are shown in U.S. Pat. Nos. 4,061,309; 4,165,861; 4,597,584; 4,743,037; and 4,746,133. These patents all show a leveling system having four jacks located one adjacent each corner of the vehicle.

It is an object of the present invention to provide a three-leg system for leveling a vehicle. It is a another object of the invention to provide a leveling system which is simple and efficient in its construction, and which is easily operated and provides highly satisfactory performance. It is a further object of the invention to provide a vehicle leveling system which is efficiently packaged and provides a minimal number of hydraulic and electrical connections to install. It is a further object of the invention to provide a leveling system which is adaptable for installation on a wide variety of vehicles.

In accordance with the invention, a system for leveling a vehicle, such as a recreational vehicle, comprises a number of extendable and retractable fluid-operated jacks mounted to the frame of the vehicle. In a preferred form, the system includes three jacks, two of which are located at opposite sides of the rear of the vehicle frame, with the third jack being centrally located at the front end of the vehicle frame. The system further includes a selectively operable source of pressurized fluid, such as a hydraulic pump, for supplying pressurized fluid from a reservoir. Broadly, the system includes a leveling arrangement for selectively providing pressurized fluid to certain of the jacks, to extend the jacks and to level the vehicle. Each jack includes a spring urging it to retract, with fluid pressure supplied to the jack overcoming the force of the spring to cause extension of the jack When it is desired to retract the jacks, the leveling arrangement opens the jacks to reservoir to allow the springs to retract the jacks and to expel fluid therefrom to the reservoir.

The invention provides a number of features which provide highly advantageous construction, operation and/or installation of the vehicle leveling system.

In accordance with one feature of the invention, fluid pressure from the pump is provided to a primary supply/return line. A series of secondary supply/return lines each extend between the primary supply/return line and one of the jacks. A supply/return control valve is disposed in each secondary supply/return line. Each supply/return control valve is movable between a first position providing communication between the primary supply/return line and one of the jacks, to provide supply or return flow of fluid through the secondary supply/return line and the supply/return control valve, and a second position cutting off communication between the primary supply/return line and the jack. A return line communicates between the primary supply/return line and the reservoir, and a return control valve is disposed in the return line. The return control valve is movable between a first position allowing return flow from the primary supply/return line to the reservoir, and a second position preventing return flow to the reservoir through the return line. This feature of the invention minimizes the number of valves required to provide extension and retraction of the legs, thus reducing the cost of the system and entailing less wiring to install the system. Vehicle leveling systems of which the applicants are aware employ a number of valves equally twice the number of jacks, to provide extension and retraction of the jacks. That is, known four-jack systems require eight valves, whereas known three-jack systems require six valves. In accordance with this aspect of the invention, a three-jack system requires four valves to extend and retract the jacks, whereas a four-jack system requires five valves.

In accordance with another feature of the invention, a bidirectional flow-control valve is located between each jack and the primary supply/return line, to provide slow retraction of the jacks until the vehicle wheels engage the ground, and to thereafter provide fast retraction of the jacks once the load on the jacks has been relieved by the vehicle wheels. This feature of the invention reduces the overall time required to retract the jacks.

In accordance with another feature of the invention, a low pressure switch is interconnected with the primary supply/return line for detecting a threshold pressure which indicates that all of the jacks have engaged the ground, and for thereafter commencing operation of the leveling arrangement to level the vehicle. In a preferred form, the primary supply/return line is a passage formed in a manifold, and the low pressure switch is mounted to the manifold so as to be in communication with the primary supply/return line passage to detect the low pressure threshold within the primary supply/return line passage. In addition, a high pressure switch is preferably mounted to the manifold so as to be in communication with the primary supply/return line passage. The high pressure switch is interconnected with the leveling arrangement to terminate its operation when a high pressure threshold is attained, such as occurs when one of the jacks is fully extended. Mounting of the low and high pressure switches directly to the manifold provides advantageous packaging of the manifold, valve and switch components.

In accordance with yet another feature of the invention, the reservoir comprises a tank, and the pump is located within the tank. A motor drives the pump, and the pump and motor are mounted to the tank through a mounting arrangement which includes a supply passage forming a portion of the supply line for providing supply of flow of fluid from the tank in response to operation of the pump, and a return passage forming a portion of the return line for providing return flow of fluid to the tank. The manifold, in which the primary supply/return line passage is formed, is adapted for direct mounting to the pump and motor mounting arrangement for establishing direct communication between the supply and return passages formed in the mounting arrangement and a supply and return passage, respectively, formed in the manifold, each of which is in communication with the primary supply/return line passage. The direct mounting of the valve manifold to the pump mounting arrangement eliminates the need for connecting hydraulic hoses between the valve manifold and the reservoir, and provides a clean assembly which can easily be installed on the vehicle frame.

In accordance with yet another feature of the invention, the tank includes an end wall and one or more side walls, which cooperate to form a corner. An intake tube extends from the pump into the tank for providing intake of fluid to the pump from an inlet, and a discharge tube extends from the pump into the tank for discharging fluid into the tank from an outlet. The intake tube inlet and the discharge tube outlet are located in close proximity to each other, and also in close proximity to the corner. With this arrangement, the tank can be mounted such that either the end wall or the side wall adjacent the corner defines the lowermost extent of the tank. This feature accommodates mounting of the tank to the vehicle frame such that a longitudinal axis of the tank is oriented either horizontally or vertically.

In accordance with another feature of the invention, the vehicle has a suspension which includes one or more inflatable and deflatable air bags and a source of pressurized air, and the invention includes a pneumatic control system for inflating and deflating the airbags. The vehicle suspension includes one or more air pressure supply valves interposed between the source of pressurized air and the air bags. Each supply valve is movable between a first position for supplying pressurized air to the air bags, and a second position for cutting off supply of pressurized air to the air bags. The pneumatic control system of the invention includes one or more relay valves located between each supply valve and the air bags. Each relay valve is movable between a first position establishing communication between a supply valve and one or more air bags, and a second position for exhausting air from one or more air bags. A control valve is provided for selectively moving the relay valves between their first and second positions. The control valve is interconnected with the leveling arrangement for moving the relay valves to their second position to exhaust the air bags prior to leveling of the vehicle, and for moving the relay valves to their first position to fill the air bags after retraction of the legs and prior to operation of the vehicle. The control valve is preferably an electrically operated valve disposed between the pressurized air source and each relay valve. The relay valves are movable between their first and second positions in response to supply of pressurized air, and the control valve is movable in response to the leveling arrangement between a first position for supplying pressurized air to each relay valve from the pressurized air source, and a second position for cutting off supply of pressurized air to the relay valves. This feature of the invention provides a single solenoid-operated control valve which selectively supplies air pressure to the relay valves, thus minimizing the electrical wiring involved in installing the pneumatic control system. In addition, the control valve maintains pressure within the pressurized air source, such as a pressurized air tank, even during and after exhaustion of the air bags.

In accordance with a further feature of the invention, each supply/return control valve is manually movable from its second position to its first position, as is the return control valve. This feature allows the operator to position the supply/return control valves and the return control valve so as to allow the jacks to retract due to operation of the spring associated with each jack, in the event of an electrical failure of the system. In addition, pneumatic control valve is manually operable so as to allow the air bags to be filled in the event of an electrical failure of the system.

In accordance with yet another feature of the invention, the leveling arrangement is interconnected with the transmission neutral switch and the parking brake switch. When the operator starts the vehicle engine while the jacks are extended and either the parking brake is disengaged or the transmission is taken out of neutral or park, the jacks are automatically retracted.

In accordance with a further feature of the invention, the front jacks are retracted before the rear jacks when the operator initiates retraction. This minimizes side loads which can be incurred due to the geometry of the vehicle suspension during lowering of the jacks. The front jacks are preferably retracted until the front wheels engage the ground and the front jack is lifted from the ground, before the rear jacks begin retraction.

In accordance with a further feature of the invention, the leveling arrangement is interconnected with a sensing system for sensing voltage across the pump motor, which is operated off the vehicle battery. In the event the vehicle battery voltage is low, the current supplied to the pump from the battery will increase, and may cause damage to the pump. The sensing system senses if the voltage at the pump falls below a predetermined threshold, and operation of the leveling arrangement is terminated if the voltage at the pump motor is less than the predetermined threshold. When this occurs, the jacks can still be retracted to allow operation of the vehicle.

The features of the invention as summarized in the foregoing paragraphs may be employed separately or in various subcombinations in a vehicle leveling system. In a particularly preferred form of the invention, however, the features are combined in a single leveling system providing highly satisfactory construction, operation and/or installation.

Various other features, objects and advantages of the invention will be made apparent from the following description, taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
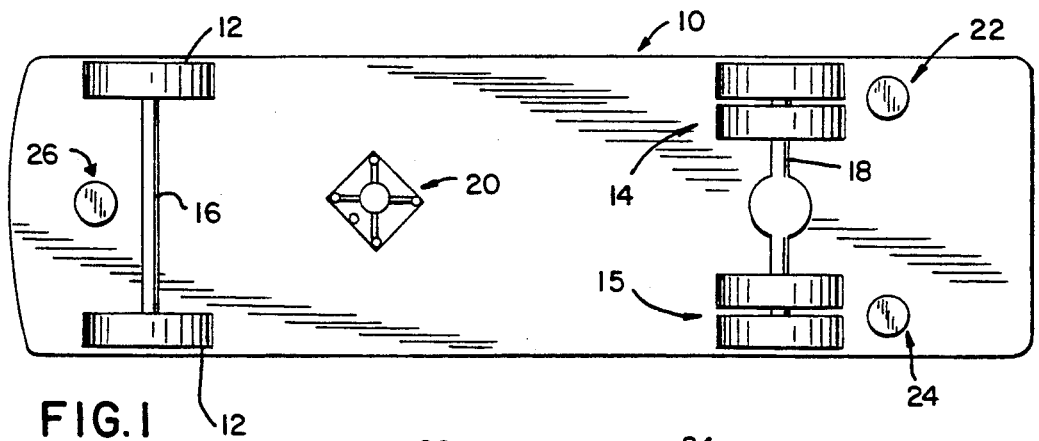
FIG. 1 is a schematic bottom plan view of the vehicle leveling system of the invention installed on a vehicle, such as a recreational vehicle.

FIG. 1 illustrates the underside of a recreational vehicle 10 having a pair of front tires 12 and two sets of rear tires, shown at 14, 15. A front axle 16 extends between front tires 12, and a rear axle 18 extends between rear tire sets 14, 15. Front axle 16 and rear axle 18 are mounted to the frame (not shown) of vehicle 10.

In accordance with the invention, a leveling system is mounted to the vehicle frame, and includes a level-sensing switch 20, a pair of rear jacks 22, 24, and a front jack 26. Rear jack 22 is located adjacent rear tire set 14, while rear jack 24 is located adjacent rear tire set 15. Front jack 26 is centrally located between front tires 12 adjacent front axle 16. As will be explained, switch 20 is interconnected with a controller and a hydraulic system (not shown in FIG. 1), to control extension and retraction of jacks 22-26, resulting in raising of vehicle 10 to level the vehicle and lowering of vehicle 10 to allow operation of the vehicle.

While the leveling system of the invention is shown in conjunction with a recreational vehicle, it is to be understood that the system is capable of providing leveling of any vehicle or other movable structure.

Figure 2:
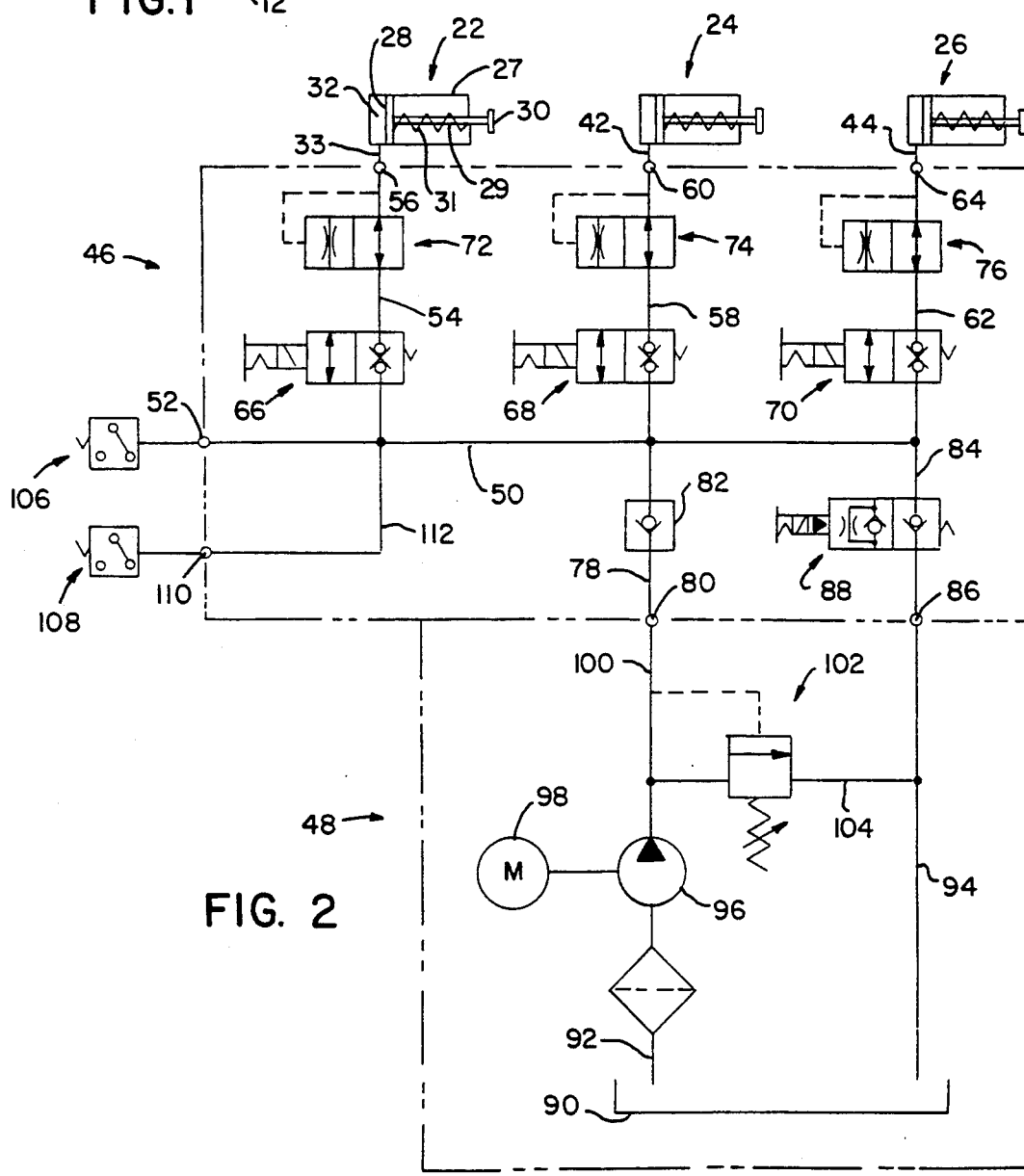
FIG. 2 is a hydraulic schematic of the vehicle leveling system of the invention.

FIG. 2 schematically illustrates the hydraulic circuitry of the vehicle leveling system according to the invention. The hydraulic system of FIG. 2 is interconnected with jacks 22-26, and reference is made to jack 22 in FIGS. 2 and 3 for a brief description of its construction, with the understanding that jacks 24 and 26 are constructed identically to jack 22.

Figure 3:
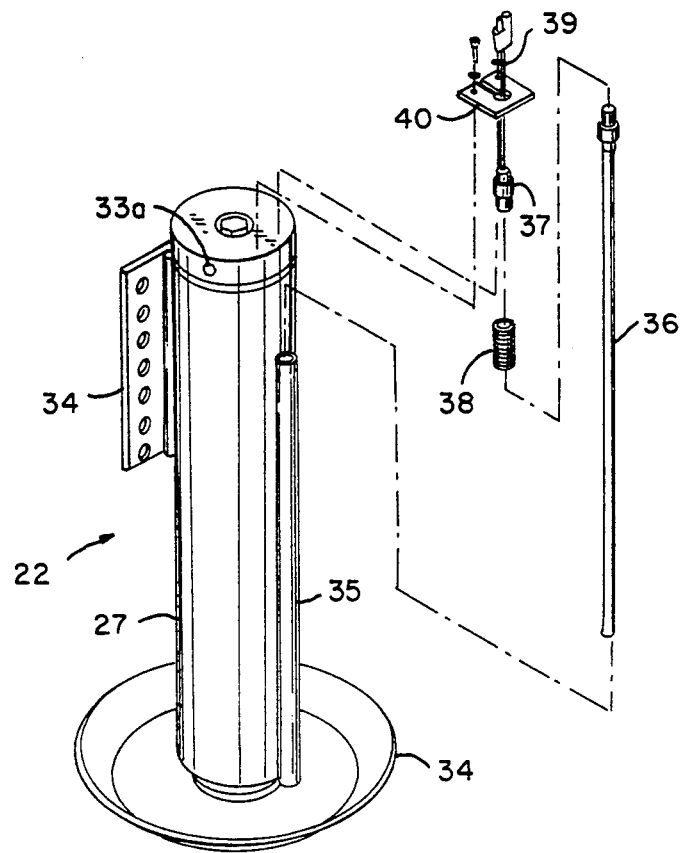
FIG. 3 is an exploded isometric view of one of the extendable and retractable jacks employed in the vehicle leveling system of the invention.
Figure 4:
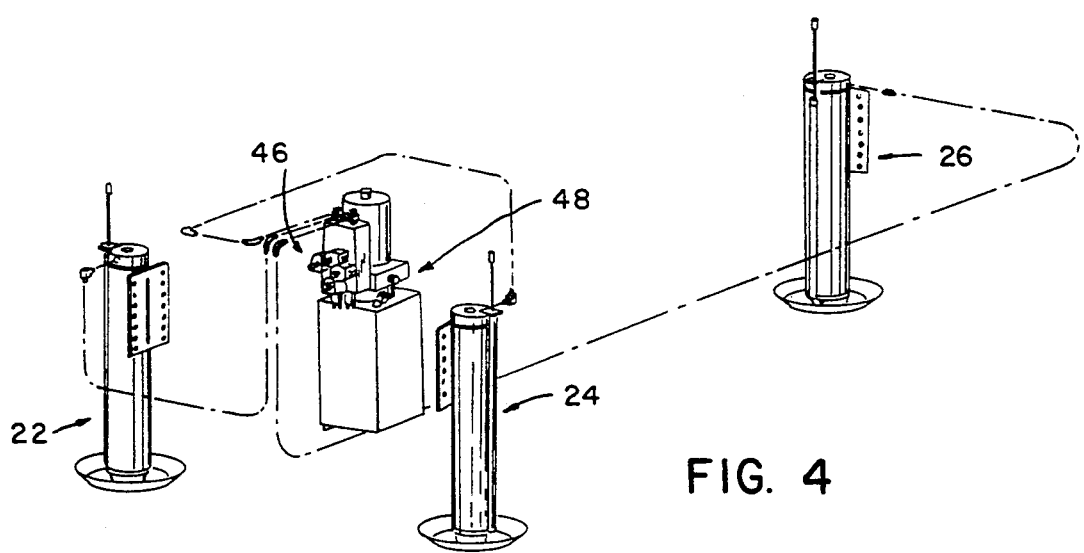
FIG. 4 is an isometric view showing the layout of the hydraulic and pneumatic components of the vehicle leveling system of the invention adapted for installation on the vehicle frame.

Referring to FIGS. 2 and 3, jack 22 generally comprises a cylinder 27 adapted to be mounted to the vehicle frame, with a piston 28 (FIG. 2) mounted for reciprocable sliding movement within cylinder 27. A rod 29 (FIG. 2) is connected to the underside of piston 28, and a foot or shoe 30 (FIGS. 2, 3) is mounted to the opposite end of rod 29. Rod 29 is interconnected with a spring 31 (FIG. 2) located in the interior of cylinder 27, for urging piston 28 upwardly and thereby urging retraction of rod 29. Cylinder 27 defines an upper chamber 32 above piston 28, to which fluid is supplied or expelled through a line 33 (FIG. 2) and a fitting 33a (FIG. 3).

Referring to FIG. 3, jack 22 includes a mounting bracket 33b connected to cylinder 27, through which jack 22 is mounted to the frame of vehicle 10. A trip rod housing 35 is mounted to the side of cylinder 27 opposite bracket 34, and a trip rod 36 is adapted for placement within trip rod housing 35. A reed switch 37 is mounted above the upper end of trip rod 36, and a spring 38 is placed between reed switch 37 and the upper end of trip rod 36 to bias them away from each other. A cable 39 extends from reed switch 37. Reed switch 37 is fixed in position by a plate 40, adapted for connection to the upper end of cylinder 27.

The lower end of trip rod 36 is engaged by the upper surface of shoe 34 when jack 22 is fully retracted, to move the upper end of trip rod 36 into engagement with reed switch 37. This closes reed switch 37, to provide a signal through cable 39 that jack 22 is fully retracted. When extension of jack 22 is commenced and jack 22 is moved away from its fully retracted position, the upper surface of shoe 34 disengages the lower end of trip rod 36 and the upper end of trip rod 36 is moved away from reed switch 37 by the action of spring 38. This opens reed switch 37, to provide a signal through cable 39 that jack 22 is extended.

The internal construction of jacks 22, 24 and 26 may generally be shown and described in co-pending application Ser. No. 07/758,278 filed Aug. 27, 1991, which is a continuation of application Ser. No. 07/327,539 filed Mar. 23, 1989, the disclosure of which is hereby incorporated by reference, with particular reference being made to FIG. 3 of such application.

As noted, jacks 24 and 26 are substantially identical in construction and operation to jack 22. Referring to FIG. 2, fluid is supplied to or expelled from jacks 24 and 26 through lines 42 and 44, respectively.

As shown in FIG. 2, lines 32, 42 and 44 extend between a valve manifold 46 and jacks 22, 24 and 26, respectively. Manifold 46 is mounted to a pump and reservoir assembly, shown generally at 48.

A primary supply/return passage 50 is formed in valve manifold 46, extending inwardly from a port 52 formed in a side of manifold 46. A secondary supply/return passage 54 extends between primary supply/return passage 50 and a port 56, to which line 32 is connected. A secondary supply/return passage 58 extends between primary supply/return passage 50 and a port 60 to which line 42 is connected, and a secondary supply/return passage 62 extends between primary supply/return passage 50 and a port 64 to which line 44 is connected.

Referring still to FIG. 2, identical supply/return control valves 66, 68 and 70 are located in secondary supply/return lines 54, 58 and 62, respectively. Supply/return control valves 66-70 are solenoid operated dual poppet bidirectional blocking valves, with a manual override, such as manufactured by Delta under its Part No. 86020151.

Valves 66-70 each include a rightward block having a double check valve and a leftward block providing free flow therethrough. Valves 66-70 are biased toward their position shown in FIG. 2, in which their rightward blocks are located in secondary supply/return lines 54-62, respectively. In accordance with known construction, valves 66-70 are shiftable rightwardly in response to supply of electrical current to a solenoid. In the event of an electrical failure, valves 66-70 can be manually shifted between their rightward and leftward positions.

When supply/return control valve 66 is in its FIG. 2 position, fluid communication between primary supply/return passage 50 and jack 22 is cut off by means of the double check valve arrangement of valve 66. Similarly, valves 68 and 70 cut off communication between primary supply/return passage 50 and jacks 24 and 26, respectively, when in their FIG. 2 position.

When supply/return control valve 66 is shifted rightwardly, communication is established between primary supply/return passage 50 and jack 22. Similarly, shifting of supply/return control valves 68 and 70 rightwardly results in communication between primary supply/return passage 50 and jacks 24 and 26, respectively.

A retraction restricting valve 72 is located in secondary supply/return passage 54, between supply/return control valve 66 and port 56. Similarly, retraction restricting valves 74 and 76 are located between supply/return control valves 68, 70 and ports 60, 64, respectively.

Retraction restricting valves 72-76 are generally constructed in accordance with the teachings of Schneider U.S. Pat. No. 4,704,947 entitled "BIDIRECTIONAL FLUID FLOW VALVE, owned by the same assignee as the present application, and the disclosure of which is hereby incorporated by reference. Valves 72, 74 and 76 provide unrestricted flow in lines 54, 58 and 62, respectively, during supply of pressurized fluid from primary supply/return passage 50 to jacks 22-26, respectively, to extend jacks 22-26. On the other hand, when fluid pressure in primary supply/return passage 50 is relieved and flow control valves 66-70 are shifted rightwardly to provide retraction of jacks 22-26, respectively, retraction restricting valves 72-76 are shifted to provide a restriction in the return flow of fluid from jacks 22-26, respectively, to primary supply/return passage 50, until pressure on jacks 22-24 is relieved to a predetermined extent. In this application, retraction restricting valve 76 is shifted to provide slow retraction of front jack 26 until front wheels 12 engage the ground and relieve pressure on jack 26. When this occurs, retraction restricting valve 72 is shifted to its FIG. 2 position to eliminate the restriction in flow through valve 72 and to provide full flow of fluid thereacross in secondary supply/return line 54, to provide fast retraction of jack 22. In a similar manner, retraction restricting valve 74 provides slow retraction of jack 24 until rear tire set 15 engages the ground, and thereafter fast retraction, and retraction restricting valve 76 provides slow retraction of jack 26 until rear tire set 14 engages the ground, and thereafter fast retraction.

A supply passage 78 is formed in valve manifold 46 between primary supply/return passage 50 and a port 80. A check valve 82 is disposed within supply passage 78 between port 80 and primary supply/return passage 50, providing one-way flow of fluid from port 80 to primary supply/return passage 50. A return passage 84 extends between primary supply/return passage 50 and a port 86. A return control valve 88 is located in return passage 84 between port 80 and primary supply/return passage 50.

Return control valve 88 is a two-way normally closed solenoid operated poppet valve, such as is sold by Delta under its Part No. 85002351. Return control valve 88 provides a rightward block- having a check valve which prevents fluid flow from primary supply/return passage 50 through return passage 84 to port 86, and a leftward block having an oppositely oriented check valve which allows flow in return passage 84 from primary supply/return passage to port 86. Return control valve 88 is biased to its FIG. 2 position in which its rightward block is disposed in return passage 84. The leftward block of return valve 88 provides an alternate flow path restricting arrangement, which in this application is not used.

Pump and reservoir assembly 48 includes a reservoir 90 for containing a quantity of hydraulic fluid. An intake line 92 is located within reservoir 90, as is a discharge line 94. A pump 96 draws hydraulic fluid from reservoir 90 through intake line 92, and a pump motor 98 provides operation of pump 96. Pump 96 supplies fluid under pressure to a supply passage 100, which is connected to port 80 for supplying pressurized fluid to valve manifold supply passage 78 in response to operation of pump 96.

Discharge line 94 is connected to port 86 and thereby to return passage 84, for returning hydraulic fluid to reservoir 90 when return control valve 88 is shifted rightwardly.

A high pressure relief valve 102 is located in a line 104 spanning between supply passage 100 and discharge line 94.

Referring still to FIG. 2, a low pressure switch 106 is mounted to valve manifold 46 at port 52, so as to be in communication therethrough with primary supply/return passage 50. Similarly, a high pressure switch 108 is mounted to valve manifold 46 at a port 110, which communicates through a passage 112 with primary supply/return passage 50. Low pressure switch 106 is set to be actuated when a relatively low threshold of pressure, e.g. 350 psi, is experienced in primary supply/return passage 50. High pressure switch 108, on the other hand, is set to be actuated when a relatively high threshold of pressure, e.g. 2400 psi, is experienced in primary supply/return passage 50. As will be explained, low pressure switch 106 is actuated when jacks 22-26 are lowered so as to engage the ground, to commence the leveling operation. High pressure switch 108 is actuated when one of jacks 22-26 is fully extended, such as when vehicle 10 is parked on an excessive slope or one of jacks 22-26 is located over a depression or the like in the ground.

Figure 5:
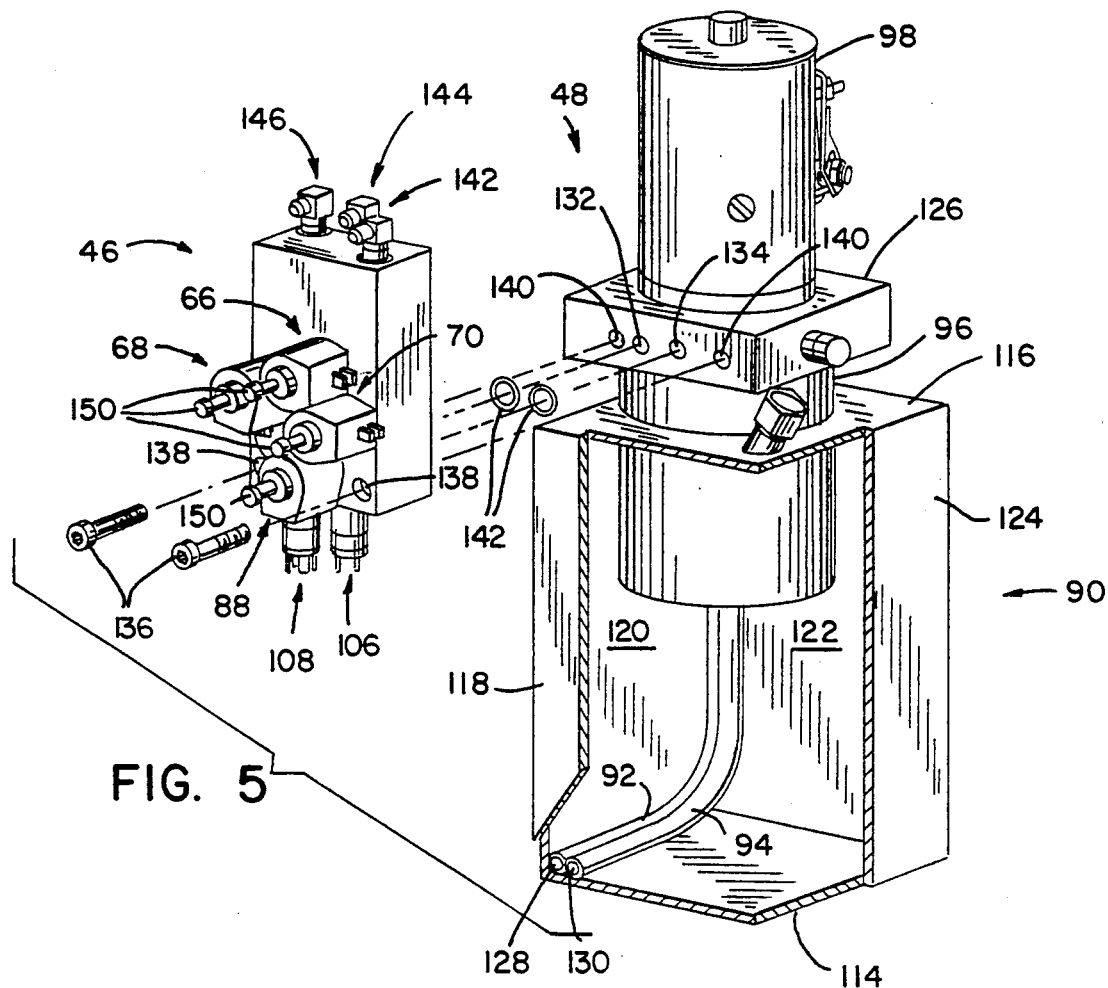
FIG. 5 is an exploded isometric view, with a portion broken away, showing the tank, pump and motor assembly and the valve manifold assembly of the vehicle leveling system of the invention.

FIG. 5 illustrates valve manifold 46 and pump and reservoir assembly 48 in detail, as illustrated schematically in FIG. 2, and like reference characters will be used where possible to facilitate clarity.

Referring to FIG. 5 reservoir 90 is in the form of a tank having a pair of end walls 114, 116, with side walls 118, 120, 122 and 124 extending between end walls 114, 116. Pump 96 is mounted to end wall 116, and an adaptor plate 126 is mounted to the upper end of pump 96. Pump motor 98 is connected to adaptor plate 126.

Intake line 92 defines an inlet opening 128, through which fluid within reservoir 90 is supplied to pump 96 upon its operation. Discharge line 94 defines an outlet opening 130 for discharging hydraulic fluid into reservoir 90.

Intake line 92 and discharge line 94 are oriented in the interior of reservoir 90 such that inlet opening 128 and outlet opening 130 are located in close proximity to the corner defined by end wall 114 in combination with side wall 120, closely adjacent the lower end of side wall 120. With this construction of pump and reservoir assembly 48, it is possible to mount assembly 48 such that its longitudinal axis is disposed either horizontally or vertically. That is, assembly 48 can be mounted vertically as shown in FIG. 3, with end wall 114 defining the lowermost surface of reservoir 90, or along a horizontal axis in which side wall 118 defines the lowermost surface of reservoir 90. In either event, the location of inlet opening 128 and discharge opening 130 adjacent the corner defined by end wall 114 in combination with side wall 120 ensures that intake line 92 and discharge line 94 provide intake and discharge, respectively, of hydraulic fluid from or to the bottom of reservoir 90. Essentially, a line defined by the intersection of end wall 114 with side wall 120 defines an axis about which pump and reservoir assembly 48 can be pivoted to accommodate either vertical or horizontal mounting to the frame of vehicle 10.

Referring still to FIG. 5, operation of pump 96 provides hydraulic fluid under pressure to a supply port 132, and supply passage 100 (FIG. 2) extends inwardly into adaptor plate 126 from supply port 132. Similarly, a return port 134 is formed in adaptor plate 126, and communicates through a return passage formed therein with discharge line 94. Valve manifold 46 is mounted to adaptor plate 126 such that supply port 80 (FIG. 2) and return port 86 (FIG. 2), formed in the rear surface of valve manifold 46, are placed in communication with supply port 132 and return port 134, respectively, formed in adaptor plate 126. A pair of threaded socket head screws 136 extend through openings 138 formed in valve manifold 46 and into threaded openings 140 formed in the side surface of adaptor plate 126, to mount valve manifold 46 to adaptor plate 126.

O-rings 142 are placed between the rear surface of valve manifold 46 and the side surface of adaptor plate 126 to provide a fluid-tight seal between supply ports 80, 132 and return ports 86, 134 formed in valve manifold 46 and adaptor plate 126, respectively.

Referring still to FIG. 5, supply/return control valves 66, 68 and 70 comprise cartridges mounted to the front surface of valve manifold 46. Electrical prongs extends from each of valves 66–70 for providing an electrical connection thereto to control operation of the solenoid associated with valves 66–70. A series of 90° elbows 144, 146 and 148 are mounted to valve manifold 46 at ports 56, 60 and 64 (FIG. 2), respectively, in the upper end of vertical passages which comprise secondary supply/return passages 54, 58 and 62 formed in valve manifold 46. Each elbow 144–148 includes a nipple adapted to receive one end of a hydraulic line, the other end of which is connectable to one of jacks 22–26. Retraction restricting valves 72–76 are placed within the vertical passages formed in valve manifold 46, between elbows 144–148 and supply/return control valves 66–70.

Return control valve 88 is similarly in the form of a cartridge mounted to the front surface of valve manifold 46, for controlling return flow of hydraulic fluid to return port 134. The cartridge comprising return control valve 88 further includes electrical connectors for operating the solenoid associated with valve 88, in a manner similar to valves 66–70.

Low-pressure switch 106 and high-pressure switch 108 are mounted in ports 52, 110, respectively, formed in the lower surface of valve manifold 46. Switches 106, 108 each include electrical connectors for interconnection with the leveling system, as will be explained.

The cartridges which comprise supply/return control valves 66–70, and return control valve 88, each include a knurled end knob 150 which allows an operator to manually shift valves 66–70 and 88 in the event of an electrical failure, wherein supply of electricity to the solenoids of valves 66–70 and 88 is cut off. As will be explained, this allows jacks 22–26 to be retracted in the event they are extended when an electrical failure occurs.

Figure 6:
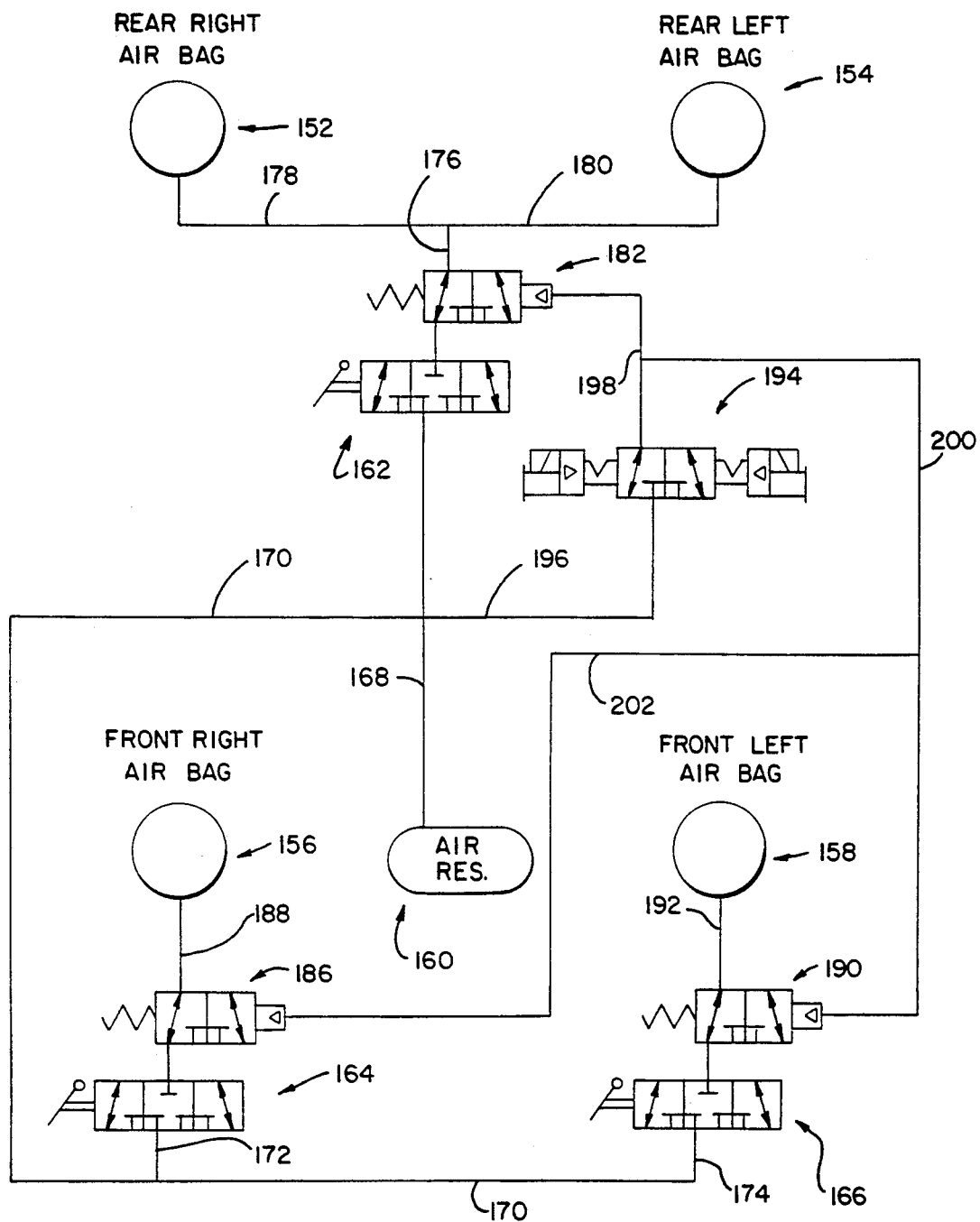
FIG. 6 is a schematic representation of the pneumatic control system forming a part of the leveling system of the invention in combination with the vehicle pneumatic system.

FIG. 6 schematically illustrates the pneumatic system of vehicle 10 having a suspension which includes a series of air bags, such as shown at 152, 154, 156 and 158, located one adjacent the location of each of the vehicle wheels. The vehicle further includes an air reservoir 160 containing a supply of pressurized air, furnished by an air compressor (not shown) as is known in the art. The vehicle suspension includes a rear air bag height valve 162, a front right air bag height valve 164, and a front left air bag height valve 166. Height valves 162–166 are supplied with the vehicle suspension, and in normal operation selectively supply pressurized air to bags 152–158, or exhaust air therefrom, in order to maintain a predetermined height between the axles and the vehicle frame. A line 168 extends between air tank 160 and height valve 162, and a line 170 tees into line 168 and is interconnected with height valves 164 and 166 through lines 172, 174, respectively. A line 176 extends between height valve 162 and a pair of lines 178, 180, which extend to air bags 152, 154, respectively.

The components of the pneumatic system described to this point are typically furnished with the vehicle, and the construction and operation of such components is known in the art.

In accordance with the invention, a relay valve 182 is connected in line 176 between height valve 162 and lines 178, 180. Similarly, a relay valve 186 is connected in a line 188 extending between height valve 164 and air bag 156, and a relay valve 190 is connected in a line 192 extending between height valve 166 and air bag 158. Relay valves 182, 186 and 190 are pilot operated air relay valves such as are available from Humphrey under Part No. P1103. Relay valves 182, 186 and 190 are spring biased to their positions as shown in FIG. 6, establishing communication in lines 176, 188 and 192, respectively. In response to the supply of pilot air pressure, relay valve 182 is shiftable leftwardly so as to cut off communication between height valve 162 and lines 178, 180, and establishing a vent to atmosphere of line 176 to exhaust air bags 152 and 154. Similarly, shifting of relay valve 186 leftwardly cuts off communication of height valve 164 with air bag 156, and air bag 156 is exposed to atmosphere through relay valve 186. Relay valve 190, when shifted leftwardly, cuts off communication of height valve 166 with air bag 158, and opens air bag 158 to atmosphere so as to exhaust air bag 158.

A pneumatic control valve 194 is interconnected with line 168 through a line 196, so as to be exposed to pressurized air within air tank 160. A line 198 provides communication between control valve 194 and the pilot end of relay valve 182. A line 200 communicates between line 98 and the pilot end of relay valve 190, and a line 202 communicates between line 200 and the pilot end of relay valve 186.

Control valve 194 is a double acting solenoid operated valve, with manual override, such as manufactured by Norgren under its designation "NUGGET 200", Part No. K41DA00-K1L-K1L. Control valve 194 is normally in its position as shown in FIG. 6, in which communication between lines 196 and 198 is cut off. When control valve 194 is in this position, relay valves 182, 186 and 190 provide nothing more than conduits for passage of air between the air bags and the height valves. When it is desired to commence leveling by extending jacks 22–26, in a manner to be explained, control valve 194 is shifted leftwardly so as to establish communication between lines 196 and 198. When this occurs, the pilot ends of relay valves 182, 186 and 190 are exposed to air pressure from air tank 160 through control valve 194. Air bags 152 and 154 are exhausted through relay valve 182, while air bags 156 and 158 are exhausted through relay valves 186 and 190, respectively. Pressurized air is maintained within air tank 160 and the lines interconnecting air tank 160 with height valves 162–166 when air bags 152–158 are exhausted. When it is again desired to operate vehicle 10, control valve 194 is shifted rightwardly so as to cut off the supply of pressurized air to relay valves 182, 186 and 190, to recharge air bags 152–158 from air tank 160 prior to operation of vehicle 10. In contrast with prior art systems, which dumped the entire supply of pressurized air from the air bags and the air reservoir, the present invention provides a system which exhausts only the air bags, and which accordingly takes less time to recharge the air bags since it is not necessary to recharge the air tank as well.

Figure 7:
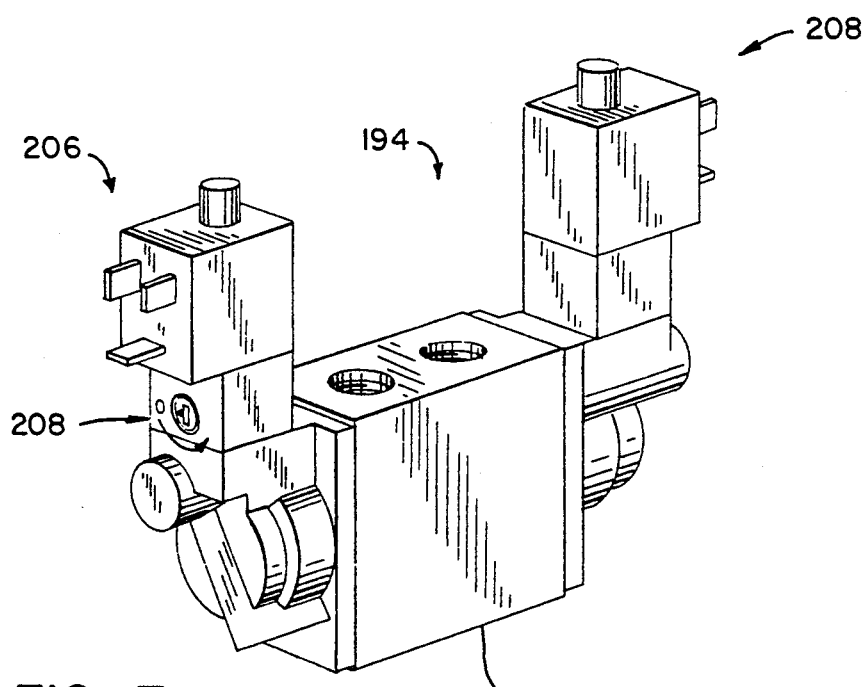
FIG. 7 is an isometric view of the pneumatic control valve incorporated in the pneumatic control system shown in FIG. 6.

FIG. 7 illustrates a physical embodiment of pneumatic control valve 194. Generally, control valve 94 includes a valve body 204 to which lines 196 and 198 are connected. The solenoids which provide shifting movement of control valve 94 each include electrical inputs 206, 208, which are interconnected with the vehicle leveling system in a manner as will be described. A manual override knob 208 is provided for selectively shifting control valve 194 to its position as shown in FIG. 6, which allows air bags 152-158 to be filled from air pressure within air tank 160 even in the event of an electrical failure which prevents operation of the solenoids associated with control valve 194. This allows vehicle 10 to be operated even in the event of such an electrical failure.

Figure 8:
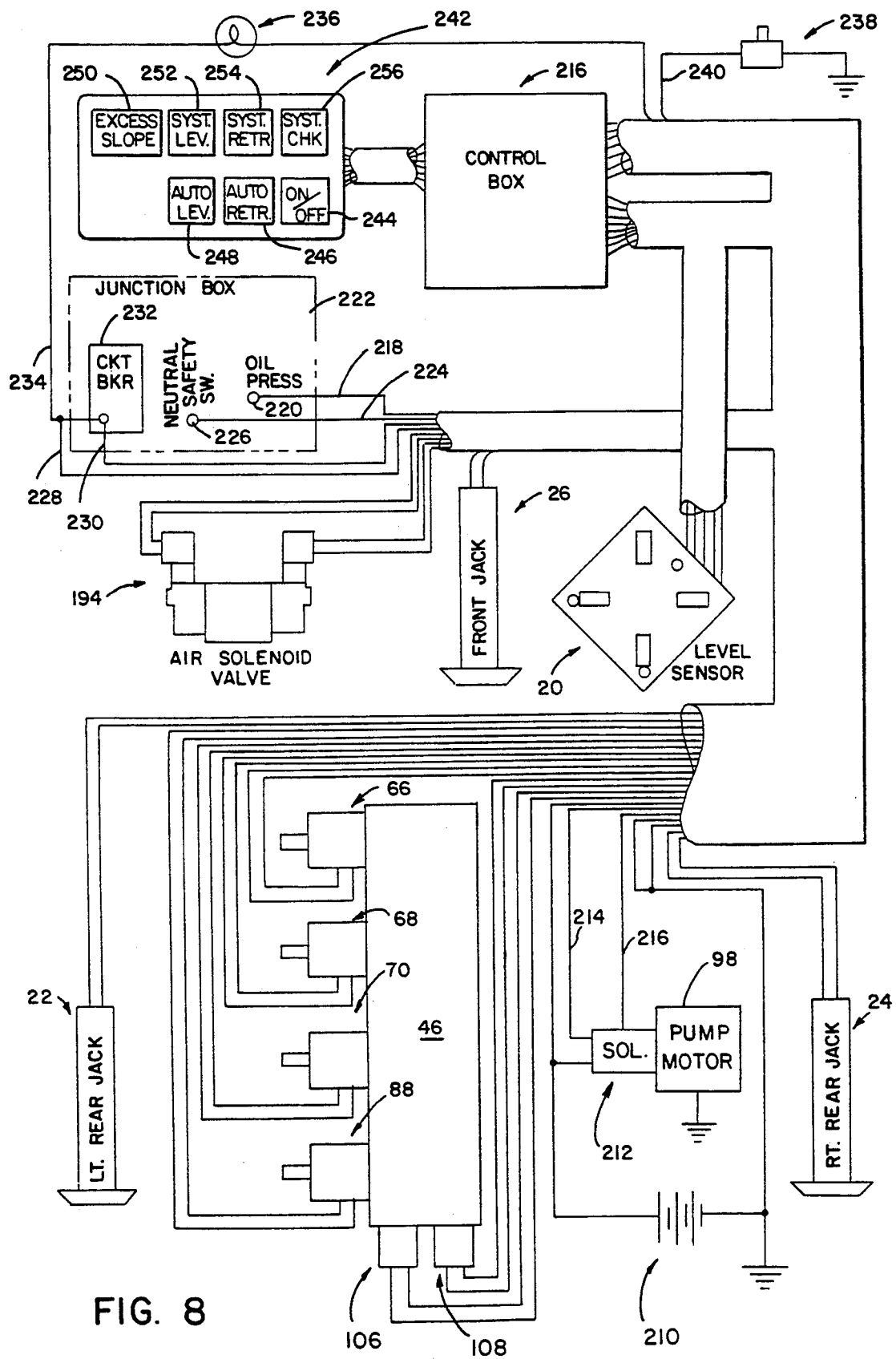
FIG. 8 is a schematic wiring diagram of the vehicle leveling system of the invention.

FIG. 8 schematically illustrates the electrical wiring connections involved with the leveling system components as shown as described with respect to FIGS. 1-7. As shown in FIG. 8, a pair of wires extend from each of jacks 22-26. Such wires are interconnected with the limit reed switches associated with jacks 22-26 for providing a signal when jacks 22-26 begin extension and are moved away from their fully retracted position.

A pair of wires are interconnected with each of valves 66-70 and 88 mounted to valve manifold 46, for controlling operation of the solenoids of valves 66-70 and 88. A pair of wires are also interconnected with each of low and high pressure switches 106, 108, for providing a signal n response to detection of low or high pressure, respectively, within valve manifold 46.

The vehicle battery, shown at 210, is interconnected with the starting solenoid, shown at 212, of pump motor 98. A pair of wires 214, 215 are connected across solenoid 212 for sensing voltage at solenoid 212, which reflects voltage supplied thereto from vehicle battery 210. As will be explained, when the voltage at solenoid 212 drops below a predetermined level, operation of the leveling system is terminated. As is known, when voltage supplied to solenoid 212 from vehicle battery 210 drops, the current supplied to solenoid 212 necessarily increases, which may result in burning out of pump motor 98. Detecting low voltage at solenoid 212 and shutting down the leveling system in response thereto, prevents damage to pump 98 in response to such an increase in current.

Level-sensing switch 20 is wired into a microprocessor control box, shown generally at 216, as are the wires associated with jacks 22-26, valves 66-70 and 88, low and high pressure switches 106, 108, solenoid 212 and pump motor 98. In addition, wires from the solenoids associated with air control valve 194 are wired into microprocessor control box 216.

A wire 218 is interconnected with an oil pressure indicator terminal 220 associated with the vehicle's junction box, shown at 222. A wire 224 extends from the neutral safety switch terminal 226 of junction box 222. A pair of wires 228, 230 extend from the switch bank of the vehicle's circuit breaker panel, shown at 232. In addition, a wire 234 is interconnected with a "jacks down" indicator light 236 from circuit breaker panel 232, and is interconnected with microprocessor control box 216 for providing a visual indication when any of jacks 22, 24 or 26 is moved away from its fully retracted position in response to opening of a reed switch, such as 37 (FIG. 3) associated with one of the jacks.

In addition, the vehicle's parking brake switch, shown at 238, is connected via a wire 240 to microprocessor control box 216, for providing a signal in response to engagement or disengagement of parking brake switch 238.

Microprocessor control box 216 is wired into a control panel 242, which is located within the interior of vehicle 10.

Control panel 242, in a typical system, includes an ON/OFF switch 244, an automatic retract switch 246 and an automatic level switch 248. In addition, control panel 242 includes an indicator light 250 for providing an indication of excess slope, an indicator light 252 for providing an indication that the system is level, an indicator light 254 for providing an indication that the system is retracted, and an indicator light 256 for providing an indication that the system requires checking.

Figure 9:
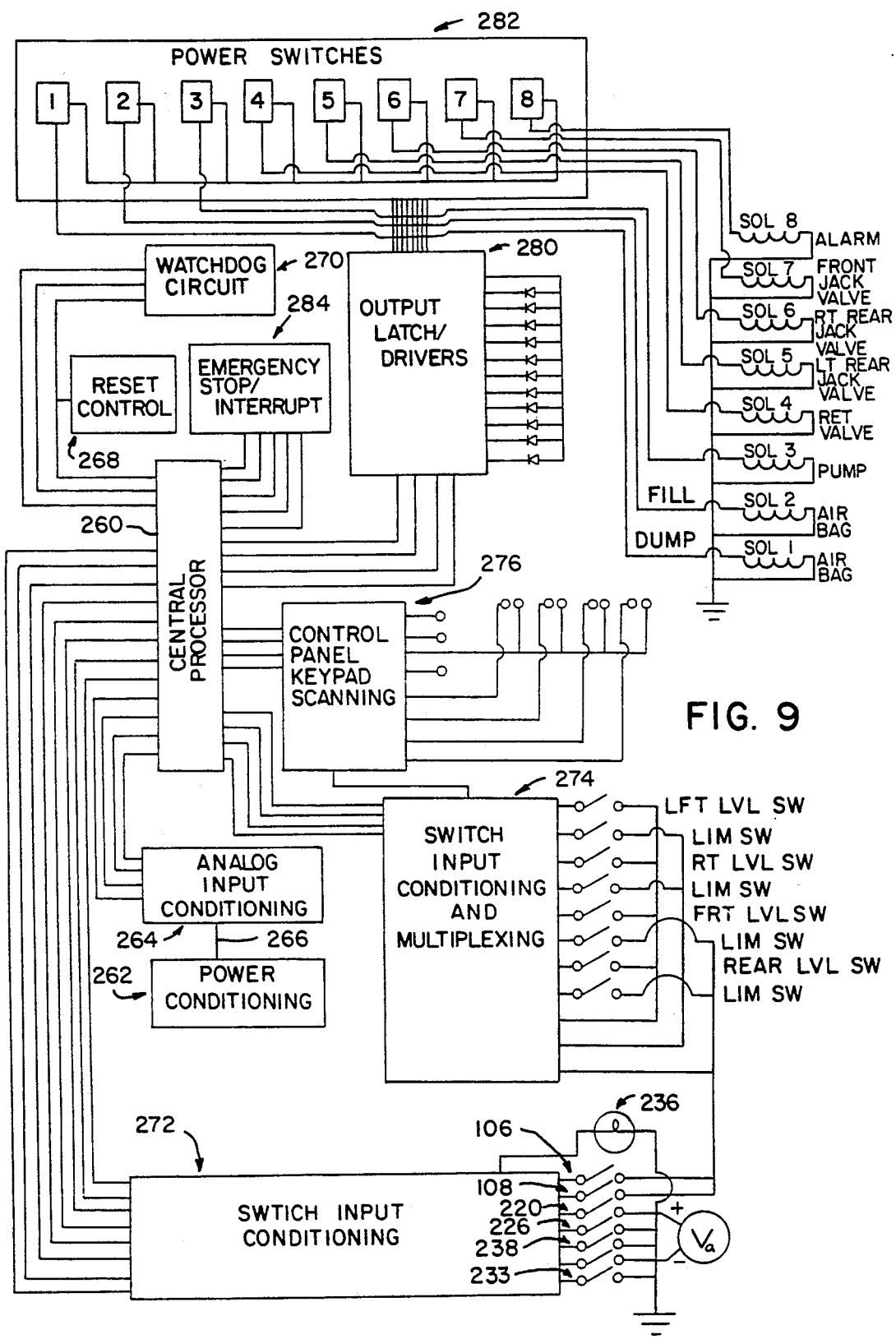
FIG. 9 is a schematic block diagram of the control system for the vehicle leveling system of the invention.

FIG. 9 represents a block diagram of the main logic schematic of microprocessor control box 216 which, in accordance with known microprocessor technology, provides operation of the vehicle levelling system of the invention in response to operator input and various conditions as sensed by various components of the system.

FIG. 9 illustrates in block form the microprocessor control system for controlling the vehicle leveling system of the invention. The control system includes a central microprocessor 260 which includes timers and clock oscillator circuitry. Processor 260 may be a processor such as is available from Motorola under its designation MC68705R3S, which is an 8 bit processor including Random Access Memory (RAM) and Programmable Read-Only Memory (PROM). The control system includes a power conditioning block 262 connected to the vehicle battery for providing power to the control system. Power conditioning block 262 includes components which provide reverse polarity protection, transient conditioning, bulk filtering and voltage regulation for a logic circuit associated therewith.

An analog input conditioning block 264 is connected to power conditioning block 264 via a bus 266, to enable detection of low voltage situations prior to loss of logic voltage from the logic circuitry of power conditioning block 262, to avert situations in which the logic circuitry of power conditioning block 262 fails to execute code in a proper manner.

The control system further includes a reset control block 268 which consists of a voltage reference, an RC filter having a rapid discharge, and a comparator. The output of the comparator of block 268 applies a reset stimulus to central processor 260 for a predetermined amount of time during initial power application, to allow the processor clock to stabilize before attempting to execute operational code. Reduction of the regulated logic voltage below a known safe operating point is also detected by a comparison of the proportioned logic power voltage applied to a pin of the comparator, and the reference voltage applied to a different pin of the comparator. Unsafe low logic power voltage levels will cause the comparator of reset control block 262 to reset processor 260, and hold the reset stimulus on the processor until the low voltage condition has been corrected.

A watchdog circuit 270, which includes a microprocessor of its own, consists of a dual retriggerable oneshot circuit with timing components connected thereon, a trigger (retrigger) input and a decoder with outputs to an interrupt input of processor 260. Watchdog circuit block 270 detects abnormalities in processing and interrupts the execution of improper code. Such abnormalities can be caused by alteration, over time, of programmed values in the RAM operational program, or by errors in reading the programmed values caused by energetic transients impressed upon the processor bus or address lines. The output of watchdog circuit block 270 also is used as an absolute override to all output drivers, to reset the drivers to their OFF state regardless of instructions (outputs) provided by processor 260.

The control system further includes a switch input conditioning block 272 and an analog input conditioning block 274. The circuitry in analog input conditioning block 274 provides an alternative path for excess voltage of either polarity, to prevent damaging levels of voltage from existing at the analog input pins of processor 260. In addition, analog input conditioning block 274 provides for scaling of the input voltages by resistor proportions, in a manner as is known. Switch input conditioning block 272 provides "noise" filtering, transient clipping, and buffering of all of the switch inputs to processor 260, namely input from low pressure switch 106, high pressure switch 108, oil pressure terminal 220, neutral switch 226, parking brake switch 238 and circuit breaker panel 232. In addition, switch input conditioning block 272 includes "pull-up" resistors for ground true switches and "pull-down" resistors for vehicle voltage true state switches. The "pull-up" and pull-down" resistors minimize ambiguities caused by failures in the external circuitry which may also be connected to the switch contacts being used as inputs to switch input conditioning block 272.

The control system further includes a switch input conditioning and multiplexing block 274, which provides the same basic filtering and transient conditioning as switch input conditioning block 272, but includes a complex buffer multiplexer circuit. In a manner as is known, input/output requirements which exceed the capacity of the port structure of processor 260, are resolved by multiplexing two or more signals to each pin of a processor port. Block 274 provides for imputting of eight switch signals into four port pins.

The control system further includes a keypad scanning block 274. Keypad scanning block 274 includes a latch circuit microprocessor, the output of which is buffered by another microprocessor to activate a row of switches, including switches 244, 246 and 248, in the matrix of control panel 242. If one of switches 244-248 is "true", i.e. activated, the associated column line changes to the active state and is detected by the processor of keypad scanning block 276 via digital states on certain ports of the keypad scanning microprocessor. The row and column lines are "buffered" to protect the processor and other circuitry of keypad scanning block 276 from transient discharge damage. Keypad scanning block 276 further provides capabilities for up to four rows and four columns of a keypad, i.e. a 16-key matrix keypad. In the application of the present invention, however, only three switches, namely switches 244-248 are employed. Keypad scanning block 8 is interconnected with watchdog circuit block 270.

The control system further includes an output latch/-driver block 280, which consists of a series of complex integrated circuits which can "decode" and "latch" the processor commanded state into a selected output. Each driver circuit includes a clearing function which is capable of positively turning off all outputs of the integrated circuits, and is connected to watchdog circuit block 270. The outputs of one of the integrated circuits of output latch/driver block 280 are directed to a power switch block 282.

Power switch block 282 includes a series of identical power switches each including a high power transistor, a current sampling resistor, and circuitry responding thereto which can be triggered ON to bypass the base driver to the power transistor if the current through the sampling resistor exceeds a predetermined level. The bypassing circuitry will RESET whenever the base drive for the power transistor is removed. The power switches are self-resetting, overload protected, high side drivers with integral fast recovery fly back diodes. Each individual power switch is interconnected with one of the solenoids to control the various components of the leveling system of the invention, namely the solenoids of supply/return control valves 66-70, return control valve 88, the two solenoids associated with pneumatic control valve 194, and solenoid 212 of pump motor 98.

Finally, the control system includes an emergency STOP/INTERRUPT block 284 which interfaces a separate optional operator-controlled emergency stop push button to a port on processor 260, which is programmed as an interrupt. Processor 260 is programmed so as to be responsible for monitoring interrupt status and control to ensure proper conditioning and response to the interrupt input.

Submitted as an appendix with this application is a print showing detailed circuitry for the control system block diagram of FIG. 9, which embodies the best mode presently known of carrying out the control system of the invention. It is believed the components shown in the appendix, and their interconnection and operation, will be apparent to one skilled in the art.

The leveling system, including the control system of FIG. 9 and its microprocessors, including central processor 260, is programmed to operate in the following manner.

Central processor 260 operates when the ignition system of vehicle 10 is turned on. When it is not desired to level the vehicle, the operator places ON/OFF switch 244 in its OFF condition. Indicator light 236 will display if any of jacks 22-26 are not completely retracted, responsive to the reed switch associated with each jack.

When it is desired to operate the leveling system, the operator places ON/OFF switch 244 in its ON condition. This can be done either to level the vehicle or to check the status of the vehicle leveling system, e.g. whether all of the jacks are retracted or whether the vehicle is level or has shifted and is no longer level. When the vehicle engine is running and jacks 22-26 are up, pneumatic control valve 194 is in its FIG. 6 position, allowing air pressure to be supplied to air bags 152-158.

To level the vehicle, the operator actuates automatic level switch 248, and an LED associated with switch 248 is illuminated. If desired, the backup alarm of the vehicle may be wired into the leveling system so as to activate the alarm for the duration of the automatic leveling sequence. Processor 260 is programmed so as to wait for a period of approximately five seconds before beginning extension of jacks 22-26. Processor 260 then outputs a signal to commence extension of jacks 22-26 in response to energizing the solenoids of supply/return control valves 66-70, to move valves 66-70 to a position allowing supply of pressurized fluid from primary supply/return passage 50 to secondary supply/return passages 54, 58 and 62. When jacks 22-26 are moved away from their fully retracted position off of the reed switch associated with each jack, processor 60 provides a signal to one of the solenoids of pneumatic control valve 194, to provide air pressure to relay valves 182, 186 and 190 so as to exhaust air bags 152-158. In a preferred form, pneumatic control valve 194 is pulsed for approximately five seconds to ensure that air bags 152-158 are fully exhausted. If the reed switch of any of jacks 22-26 is not cleared or disengaged, in one second, the automatic leveling sequence is aborted and the SYSTEM CHECK indicator 256 is illuminated. If desired, an audible alarm may also be activated to alert the operator to this condition.

Once jacks 22-24 are extended to the ground, low pressure switch 106 provides a signal to processor 260 that the low pressure threshold has been attained. Processor 260 continues extension of jacks 22-26 for approximately one second after low pressure is indicated, then pump 96 and motor 98 are shut off and supply/return control valves 66-70 are returned to their closed condition, to terminate extension of jacks 22-26.

If all of jacks 22-26 indicate the presence of low pressure in primary supply/return passage 50 without the presence of high pressure, then the leveling sequence takes place. Processor 260 checks the inputs of level-sensing switch 20 in the order of front, back, left then right. If any input to processor 20 provides a non-level signal, processor 260 provides a signal to the appropriate one of jacks 22-26 to level the vehicle. If the front of the vehicle is low, then front jack 26 is extended. If the rear of the vehicle is low, both rear jacks 22 and 24 are extended. If the left side of the vehicle is low, left rear jack 22 is extended. If the right side of the vehicle is low, right rear jack 24 is extended. When the input of level-sensing switch 20 indicates that the sensed portion of the vehicle has been leveled, processor 260 moves onto the next input from level-sensing switch 20 to repeat the leveling sequence until all inputs from level-sensing switch 20 indicate a level condition. The output of level-sensing switch 20 must be constant for a period of time, e.g. approximately two seconds, before SYSTEM LEVEL indicator 252 is illuminated.

If, during extension of jacks 22-26, high pressure switch 108 is actuated for over 0.50 seconds, and level-sensing switch 20 continues to supply a "low" indication, processor 260 aborts the automatic leveling sequence and provides a signal illuminating the EXCESS SLOPE indicator 250. The operator then must move vehicle 10 to a different location to try the leveling sequence over.

When the leveling sequence is completed and the output of level-sensing switch 20 is constant, processor 260 then tests each of jacks 22-26 individually to ensure that all jacks are on the ground. To do this, supply/return control valves 66-68 are actuated in turn for approximately 0.30 seconds, with a delay of approximately two seconds between such testing of each jack. After extending each jack in this manner, processor 260 reads low pressure switch 106 and high pressure switch 108. If low pressure is not indicated by low pressure switch 106, then the jack is not on the ground. On the other hand, if low pressure is indicated by low pressure switch 106, then the jack is satisfactorily on the ground.

If both high and low pressure are indicated by switches 106, 108, then the jack is fully extended and probably not on the ground, and to be safe processor 260 is programmed to assume that the jack is not on the ground.

If processor 260 determines that all jacks are on the ground, it then waits until the outputs from level-sensing switch 20 are constant for a period of two seconds, and activates the SYSTEM LEVEL indicator 252.

If processor 260 determines that one of the jacks is not on the ground, then that jack is extended until low pressure switch 106 detects the presence of low pressure in supply/return passage 50, to determine if the jack is fully extended. If a jack is fully extended and not on the ground, then processor 260 provides a signal to illuminate EXCESS SLOPE indicator 250 and aborts the automatic leveling sequence.

After vehicle 10 has been leveled as outlined above and jacks 22-26 have been tested, and if vehicle 10 thereafter comes out of level for a period of more than two seconds, then processor 260 deactivates SYSTEM LEVEL indicator 250 and relevels vehicle 10 as outlined above, and the individual jacks are then retested.

In the event the automatic leveling sequence is aborted, processor 260 deactivates the visual indicator associated with the automatic leveling switch 248, and at the same time cuts off power to pump motor 98 and moves supply/return control valves 66-70 to their closed position. To retract jacks 22-26, the operator actuates automatic retract switch 246, and a visual indicator associated with switch 246 is illuminated. If desired, the system may activate the backup alarm of the vehicle, which can then remain on during the duration of the automatic retracting sequence. After automatic retract switch 246 is actuated, processor 260 waits for approximately five seconds, and then moves return control valve 88 to its position allowing flow in return passage 84 and return line 94. Supply/return control valve 70 is then shifted to allow flow in secondary supply/return line 62, to retract front jack 26. At the same time, pneumatic control valve 194 is shifted to its FIG. 6 position, to fill air bags 152-158. In addition, processor 260 begins a 15 second delay timer. When the 15 seconds is up, or when front jack 26 is moved to its fully retracted position as indicated by the reed switch associated therewith, whichever is sooner, processor 260 then provides a signal to supply/return control valves 66, 68 to shift them to a position allowing return flow in secondary supply/return passages 54, 58, to retract rear jacks 22-24. Processor 260 then waits for jacks 22-26 to completely retract. If this does not occur within five minutes, processor 260 provides a signal to illuminate SYSTEM CHECK indicator 256, and simultaneously operates an audible alarm and aborts the automatic retract sequence.

When the automatic retract sequence is aborted, return control valve 88 is shifted back to its FIG. 2 position to prevent return flow of fluid in return passage 84, and supply/return control valves 66-70 are also moved to their closed FIG. 2 position. The automatic retract visual indicator of switch 246 is deactivated.

When jacks 22-26 are completely retracted, supply/return control valves 66-70 and return control valve 88 are maintained open for approximately five seconds, and the SYSTEM RETRACT visual indicator 254 is illuminated to indicate that all jacks are fully retracted, and the automatic retracting sequence is aborted.

In the event the vehicle transmission is taken out of neutral or the vehicle's parking brake is disengaged, processor 260 receives a signal indicating either of these conditions. If the vehicle engine is not running, the signal indicating that the vehicle is out of neutral will be ignored by processor 260. If either the parking brake is disengaged, or the transmission is out of neutral and the vehicle engine is running, and any of jacks 22-26 are not fully retracted for a period of time of more than 0.50 seconds, then an emergency condition is identified by processor 260. When this occurs, processor 260 provides a signal to sound an audible alarm, and provides an intermittent flashing signal to "jacks down" indicator 236, which is located on the vehicle dashboard. At the same time, corresponding warning lights on control panel 242 are flashed. If the leveling system is not already turned on, processor 260 does so, and if the vehicle engine is running immediately begins the automatic retracting sequence to retract jacks 22-26. If the automatic emergency retracting sequence is started and thereafter the vehicle engine stops running, the automatic retracting sequence will continue. During this emergency state, ON/OFF switch 244 on control panel 242 is disabled.

Various alternatives and embodiments are contemplated as being within the scope of the following claims particularly pointing out and distinctly claiming the subject matter regarded as the invention.

We claim:

1. A vehicle leveling system for use with a vehicle having an engine, a parking brake movable between an engaged position and a disengaged position and an automatic transmission movable to an inoperative position during leveling of the vehicle, comprising:
   a plurality of extendable and retractable jacks;
   jack operating means for extending the jacks to level the vehicle and for retracting the jacks;
   means for providing a first signal when the parking brake is moved to its disengaged position and for operating the jack operating means in response thereto to retract the jacks; and
   means for providing a second signal when the vehicle transmission is moved out of its inoperative position when the engine is operating and for operating the jack operating means in response thereto to retract the jacks.

2. The vehicle leveling system of claim 1, further comprising indicating means for indicating retraction of the jacks.

3. The vehicle leveling system of claim 2, wherein the indicating means comprises an audible and visual alarm.

4. In a vehicle leveling system for use with a vehicle having an engine, a parking brake movable between an engaged position and a disengaged position, and an automatic transmission movable to an inoperative position during leveling of the vehicle, the vehicle leveling system including a plurality of extendible and retractable jacks, a method of retracting the jacks, comprising the steps of:
   sensing when the parking brake is moved to its disengaged position to provide a first sensed condition and automatically retracting the jacks in response thereto; and
   sensing when the vehicle transmission is moved out of its inoperative position while the vehicle engine is operating to provide a second sensed condition and automatically retracting the jacks in response thereto.

5. The method of claim 4, further comprising the steps of providing an indication of the first sensed condition and providing an indication of the second sensed condition.

* * * * *